United States Patent
McClure

(10) Patent No.: US 9,638,233 B1
(45) Date of Patent: May 2, 2017

(54) FASTENER SYSTEM

(71) Applicant: C&D ZODIAC, INC., Huntington Beach, CA (US)

(72) Inventor: Richard McClure, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 15/399,609

(22) Filed: Jan. 5, 2017

Related U.S. Application Data

(63) Continuation of application No. 14/668,627, filed on Mar. 25, 2015, now Pat. No. 9,562,549.

(60) Provisional application No. 62/009,762, filed on Jun. 9, 2014.

(51) Int. Cl.

| | |
|---|---|
| *F16B 2/12* | (2006.01) |
| *F16B 21/09* | (2006.01) |
| *F16B 2/18* | (2006.01) |
| *F16B 5/06* | (2006.01) |
| *F16B 21/06* | (2006.01) |
| *B64C 1/06* | (2006.01) |
| *B64D 11/02* | (2006.01) |

(52) U.S. Cl.
CPC ............ *F16B 21/09* (2013.01); *B64C 1/066* (2013.01); *B64D 11/02* (2013.01); *F16B 2/12* (2013.01); *F16B 2/185* (2013.01); *F16B 5/0621* (2013.01); *F16B 21/065* (2013.01)

(58) Field of Classification Search
CPC .......... B64D 11/02; B64D 2700/62482; F16B 21/065; F16B 21/09; F16B 2/10; F16B 2/12; F16B 2/185; F16B 5/0607; F16B 5/0621; Y10T 24/45707; B64C 1/066
See application file for complete search history.

(56) References Cited

U.S. PATENT DOCUMENTS

| | | |
|---|---|---|
| 3,538,940 A | 11/1970 | Graham |
| 3,727,160 A | 4/1973 | Churchill |
| 4,352,586 A | 10/1982 | Hayden |
| 4,683,453 A | 7/1987 | Vollmer |
| 5,000,614 A | 3/1991 | Walker |
| 5,451,082 A | 9/1995 | Murai |
| 5,518,332 A | 5/1996 | Katoh |

(Continued)

OTHER PUBLICATIONS

PCT/US15/22522 International Search Report & Written Opinion dated Jun. 25, 2015.

*Primary Examiner* — David Upchurch

(74) *Attorney, Agent, or Firm* — Jeffer Mangels Butler & Mitchell LLP; Brennan C. Swain, Esq.

(57) ABSTRACT

A fastener system that includes a female fastener assembly with a housing having a channel defined therein and a switch member movable within the channel between removing and fastening positions. The switch member includes a receiver portion having a post opening defined therein and a switch portion. The housing includes a lower opening. The post opening includes a removing portion that is aligned with the lower opening when the switch member is in the removing position and a fastening portion that is aligned with the post opening when the switch member is in the fastening position. The system also includes a male fastener assembly having a post with a slot therein. The post is received through the lower opening in the housing and the post opening so that the slot is aligned with the channel. The slot receives a portion of the receiver portion when the switch member is in the fastening position.

11 Claims, 4 Drawing Sheets

(56) References Cited

U.S. PATENT DOCUMENTS

| | | |
|---|---|---|
| 5,704,100 A | 1/1998 | Swan |
| 5,964,483 A | 10/1999 | Long |
| 6,178,844 B1 | 1/2001 | Burger |
| 6,505,387 B1 | 1/2003 | Yatskov |
| 6,557,220 B1 | 5/2003 | Hamm, Jr. |
| 7,128,514 B1 | 10/2006 | Le Beau |
| 7,704,008 B2 | 4/2010 | Shinozaki |
| 8,221,043 B2 | 7/2012 | Guyton |
| 8,632,054 B2 | 1/2014 | Carlson |
| 2007/0029460 A1 | 2/2007 | Fitzler |
| 2009/0008927 A1 | 1/2009 | Binder |
| 2009/0133571 A1 | 5/2009 | Pfister |
| 2009/0179111 A1 | 7/2009 | Ebner |
| 2009/0293242 A1 | 12/2009 | Bithell |
| 2010/0303542 A1 | 12/2010 | Costabel |

FASTENER SYSTEM

CROSS REFERENCE TO RELATED APPLICATIONS

This application is a continuation of U.S. patent application Ser. No. 14/668,627, filed Mar. 25, 2015, which claims the benefit of U.S. Provisional Application No. 62/009,762, filed Jun. 9, 2014, both of which are incorporated by reference herein in their entireties.

FIELD OF THE INVENTION

The present invention relates generally to a fastener system, and more particularly to a fastener system for securing two panels to one another.

BACKGROUND OF THE INVENTION

Commercial aircraft, such as the Airbus A320 or Boeing 737, are typically constructed from modular components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. The manufacturers do some by configuring the interiors using monuments, which are interchangeable. Commercial passenger aircraft generally include lavatories for use by passengers and crew, which are one example of monuments.

A conventional lavatory has a rectangular footprint, a toilet, and a sink. It usually also has four composite panel walls that may be molded to fit the curvature of the plane, and a ceiling with built in lighting. The lavatory monument is secured to the aircraft via various tie-rods and brackets, and is designed to independently conform to FAA loading standards. Lavatories have been a standard monument on commercial aircraft for decades. Lavatory monuments are typically constructed as a unit and then installed in an aircraft. After use, the conventional lavatory monument is then removed as a unit from the aircraft and replaced.

As mentioned above, aircraft manufacturers are constantly refining interior aircraft designs. Thus, it would be cost efficient if aircraft manufacturers were able to continue to refine or improve a monument after installation, rather than replacing the entire monument. For example, it would be helpful if aircraft manufacturers could quickly and easily change modules and/or panels in a lavatory monument that has already been installed.

SUMMARY OF THE PREFERRED EMBODIMENTS

The present invention is a fastener system that can be used for joining panels, particularly in aircraft interiors. In accordance with a first aspect of the present invention there is provided a fastener system for joining a first item and a second item. The fastener system includes a female fastener assembly that includes a housing having an upper surface, a lower surface and a channel defined therein. The female fastener assembly further comprises a switch member that is movable within the channel in the housing between a removing position and a fastening position. The switch member includes a receiver portion having a post opening defined therein and a switch portion. The housing includes a lower opening defined therein that extends through the lower surface thereof and is in communication with the channel. The post opening includes a fastening portion and a removing portion. The removing portion is aligned with the lower opening when the switch member is in the removing position and the fastening portion is aligned with the post opening when the switch member is in the fastening position. The fastening system also includes a male fastener assembly that includes a post having a slot defined therein. At least a portion of the post is received through the lower opening in the housing and the post opening such that the slot is aligned with the channel. The slot receives a portion of the receiver portion when the switch member is in the fastening position.

In a preferred embodiment, the switch portion is spring biased upwardly. Preferably, the switch portion includes a shaft that extends outwardly from at least one side thereof, the housing has a slot defined therein that is in communication with the channel, and the shaft is received in the slot when the switch member is in the fastening position. In a preferred embodiment, the lower opening of the housing is a self-aligning opening and is at least partially defined by an inclined surface, such that when the post is inserted into the lower opening, the inclined surface guides the post into the lower opening. Preferably, the post also includes an inclined surface that engages the inclined surface of the housing when the post is inserted into the lower opening.

In a preferred embodiment, the removing portion of the post opening has a width that is wider than a width of the fastening portion of the post opening. Preferably, the post has a girth that is smaller than the width of the removing portion of the post opening and a width of the lower opening of the housing, but a girth that is wider than the width of the fastening portion. In a preferred embodiment, the male fastener assembly includes an insert extending downwardly from the post.

In accordance with another aspect of the present invention there is provided a method of joining a first item having a female fastener assembly secured thereto to a second item having a male fastener assembly secured thereto. The method includes inserting a post of the male fastener assembly through an opening in the first item, a lower opening of a housing of the female fastener assembly, and a post opening in a switch member. The switch member includes a switch portion and a receiver portion, and the post opening is defined in the receiver portion. The method also includes moving the switch member within a channel defined in the housing from a removing position to a fastening position such that a slot defined in the post receives a portion of the receiver portion. In a preferred embodiment, the switch portion is spring biased upwardly and when the switch member is moved to the fastening position the switch portion moves upwardly such that a shaft associated with the switch portion is received in a slot defined in the housing.

In accordance with yet another aspect of the present invention there is provided a fastener system that includes a first item having an opening defined therein and a female fastener assembly that is secured to the first item. The female fastener assembly includes a housing having an upper surface, a lower surface and a channel defined therein, as well as a switch member that is movable within the channel in the housing between a removing position and a fastening position. The switch member includes a receiver portion having a post opening defined therein and a switch portion. The housing includes a lower opening defined therein that extends through the lower surface thereof, is in communication with the channel and is aligned with the opening in the first item. The post opening includes a fastening portion and a removing portion, and the removing portion is aligned with the lower opening when the switch member is in the removing position and the fastening portion is aligned with the post opening when the switch member is in the fastening position. The fastening system also includes a second item, and a male fastener assembly that is secured to the second item and includes a post having a slot defined therein. At least a portion of the post is received through the opening in the first item, the lower opening in the housing and the post opening such that the slot is aligned with the channel, and the slot receives a portion of the receiver portion when the switch member is in the fastening position.

In accordance with another aspect of the present invention there is provided a method of joining a first item having an opening and a second item using a fastener system that includes a female fastener assembly that includes a housing and a switch member, the housing having a lower opening, a channel, and a slot in connection with the channel, and the switch member having a receiver portion and a switch portion, the receiver portion having a post opening defined therein, and the switch portion being spring biased upwardly and having a shaft extending beyond the switch member on at least one side, and a male fastener assembly having a post, the post having a slot defined therein. The method includes securing the female fastener assembly to the first item, securing the male fastener assembly to the second item, inserting the post of the male fastener assembly through the lower opening of the housing, the opening of the first item to be joined, and the post opening, and moving the switch member within the channel until the shaft of the switch portion is received by the slot of the housing.

DETAILED DESCRIPTION OF THE PREFERRED EMBODIMENTS

Figure 1:
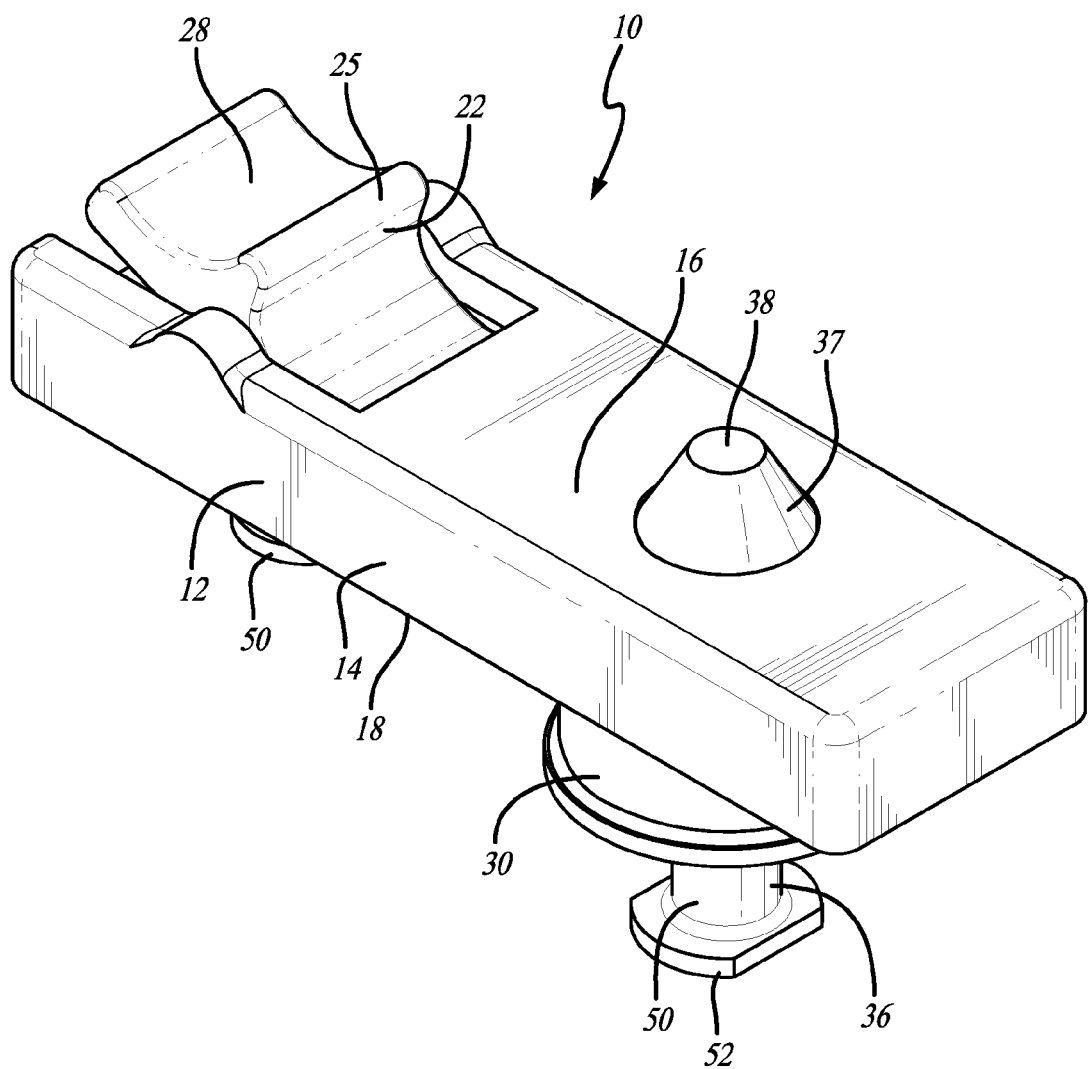
FIG. 1 is a perspective view of the fastener system in the fastening position in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show a fastener system 10 in accordance with a preferred embodiment of the present invention.

Figure 2:
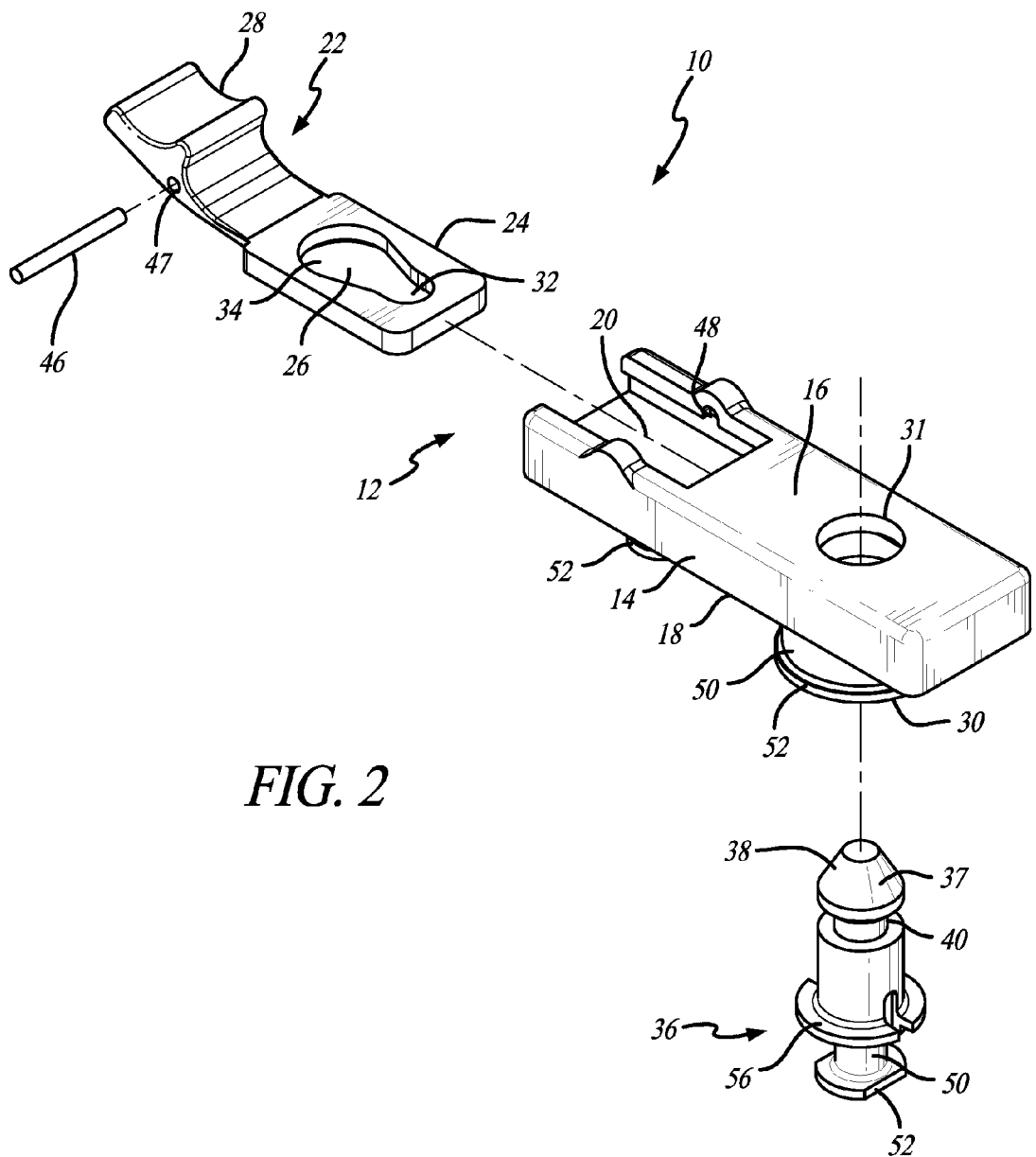
FIG. 2 is an exploded perspective view of the fastener system of FIG. 1.

As shown in FIGS. 1 and 2, in a preferred embodiment, the fastener system 10 generally includes a female fastener assembly 12 and a male fastener assembly 36. The female fastener assembly 12 includes a housing 14 and a switch member 22, and the male fastener assembly 36 includes a post 38 having a slot 40 defined therein. The housing 14 has an upper surface 16 and a lower surface 18.

FIG. 2 is an exploded perspective view of a preferred embodiment of the fastener system 10. As shown in FIG. 2, in a preferred embodiment, the housing 14 has a channel 20 defined therein and a lower opening 30 defined therein that extends through the lower surface 18 and is in communication with the channel 20. The housing 14 also preferably includes an upper opening 31 that extends through the upper surface 16. Further as shown in FIG. 2, in a preferred embodiment, the female fastener assembly 12 includes the switch member 22, which includes a switch portion 28, a neck portion 23 and a receiver portion 24. In a preferred embodiment, the receiver portion 24 has a post opening 26 defined therein. In a preferred embodiment, the post opening 26 includes a fastening portion 32 and a removing portion 34. In a preferred embodiment, the switch member 22 is movable or slidable within the channel 20. The switch portion 28 includes an engagement portion 25 in a preferred embodiment.

In a preferred embodiment, the post 38 is cylindrical and includes the slot 40 extending circumferentially therearound. In another embodiment, the slot 40 may only extend partially around the post 38. In another embodiment, the post 38 can be another shape, such as square or rectangular and the slot 40 can be a notch. As described below, the slot 40 captures a portion of the receiver portion 24, when the switch member 22 is moved to the fastening position.

In a preferred embodiment of the present invention, as shown in FIGS. 2 and 3, the post 38 may have an inclined surface 37 and the lower opening 30 may be a self-aligning opening that includes an inclined surface 39 that cooperates with inclined surface 37, such that even if the post 38 is not inserted directly into the center of the lower opening 30, the inclined surface 29 will guide the post 38 into the lower opening 30.

Figure 3A:
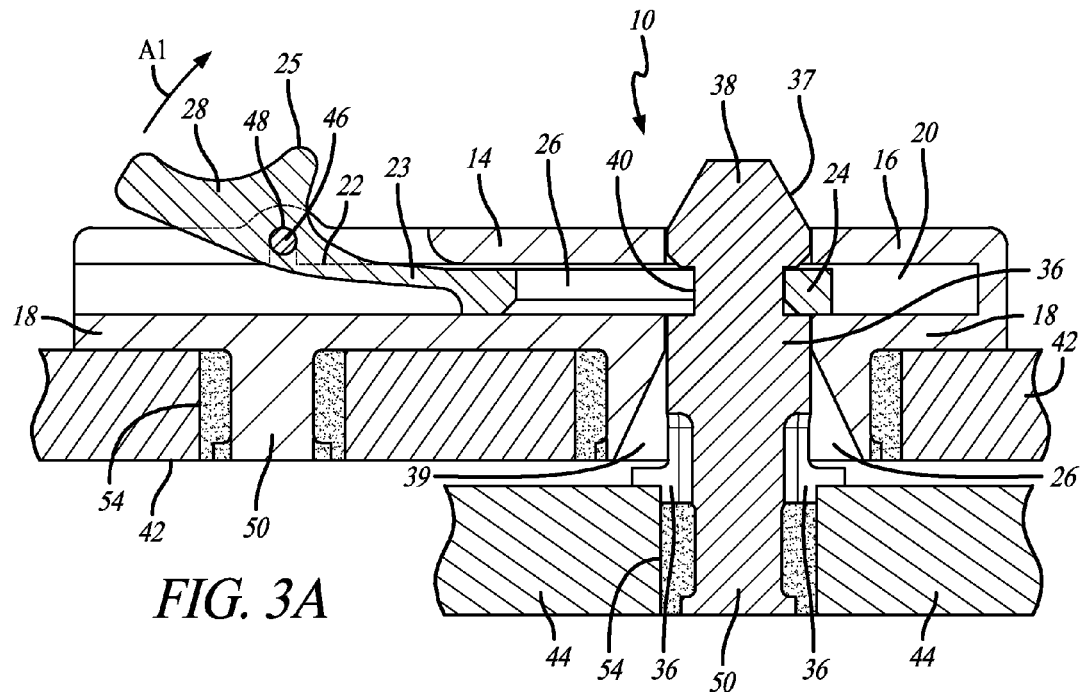
FIG. 3A is an elevational cross section of the fastener system, with the switch member in the fastening position, secured to first and second panels and securing first and second panels to one another in accordance with a preferred embodiment of the present invention.
Figure 3B:
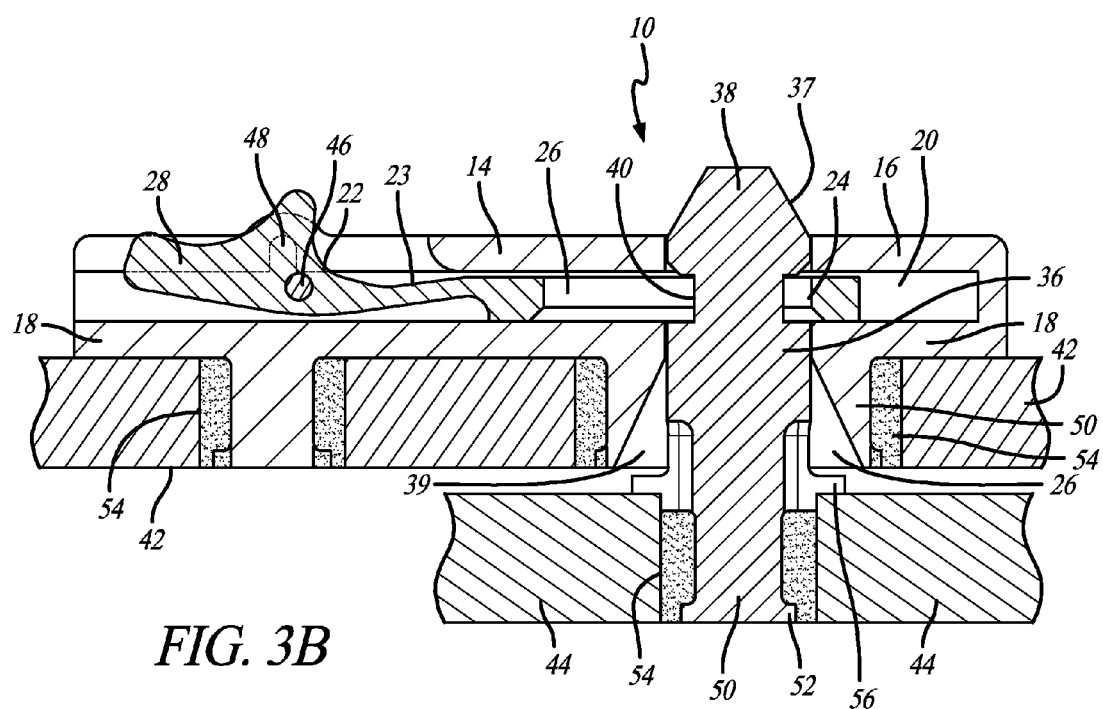
FIG. 3B is an elevational cross section of the fastener system of FIG. 3A in the removing position secured to first and second panels.

FIGS. 3A and 3B show a preferred embodiment in which the fastener system 10 is used to join a first panel 42 and a second panel 44. In a preferred embodiment, the female fastener assembly 12 is secured to the first panel 42 and the male fastener assembly 36 is secured to the second panel 44. Any method for securing the female fastener assembly 12 to the first panel 42 and the male fastener assembly 36 to the second panel 44 is within the scope of the present invention. For example, glue, adhesive, welding, threaded fasteners, rivets or the like can be used. As shown in the drawings, in a preferred embodiment, the female fastener assembly 12 includes inserts 50 extending outwardly from the housing 14. The male fastener assembly 36 also includes an insert 50 extending therefrom. The inserts 50 are inserted into openings 54 defined in the first and second panels 42 and 44 and are adhered or potted therein. The inserts 50 can include lower flanges 52 thereon that help secure the inserts 50 within the openings 54. The inserts 50 can also include a middle or upper flange 56.

FIG. 3B shows a preferred embodiment of the fastener system 10 in the removing position. As shown in FIG. 3B, in a preferred embodiment, when the switch member 22 is in the removing position, the post 38 of the male fastener assembly 36 can be freely inserted through the lower opening 30 of the housing 14 and through the removing portion 34 of the post opening 26 of the switch member 22 (and through the upper opening 31). When the switch member 22 is in the removing position, the post 38 of the male fastener assembly 36 can be freely disengaged from the female fastener assembly 12 by removing the post 38 from the removing portion 34 of the post opening 26 of the switch member 22 and the lower opening 30 of the housing 14. As shown in FIG. 3B, in a preferred embodiment, when the switch member 22 is in the removing position, the slot 40 of the post 38 does not receive any portion of the receiver portion 24 of the switch member 22. The switch member 22 moves within the channel 20 of the housing 14. The use of a preferred embodiment to join panels as shown in FIGS. 3A and 3B and as described in this specification is merely exemplary. Those of ordinary skill in the art will appreciate that the fastener system 10 can be used to join items other than panels, including walls, partitions, monuments, shelves, and other items.

FIG. 3A shows a preferred embodiment of the fastener system 10 in the fastening position. As shown in FIG. 3A, in a preferred embodiment, when the switch member 22 is in the fastening position, the post 38 of the male fastener assembly 36 extends through the lower opening 30 of the housing 14 and through the post opening 26 of the switch member 22. The slot 40 of the post 38 is aligned with the channel 20 and receives a portion of the receiver portion 24 of the switch member 22, thus preventing the post 38 from being removed from the post opening 26. In other words, the fastening portion 32 of the post opening 26 has a smaller width or diameter than the post 38. Therefore, a portion of the receiver portion 24 is captured in the slot 40. This prevents the post 38 from being pulled through lower opening 30, thus securing the post 38 within the female fastener assembly 12. It will be appreciated that in the removing position, the removing portion 34 of the post opening 26 is aligned with the post 38 and in the fastening position, the fastening portion 32 of the post opening 26 is aligned with the post. And, in the fastening position, the slot 40 creates a ledge that captures the edge of the fastening portion 32 and prevents the post 38 from being pulled out of the housing 14.

As shown by arrow A1 in FIG. 3A, in a preferred embodiment of the present invention, the switch portion 28 is spring biased upwardly. As shown in FIG. 2, the switch portion includes a shaft 46 that extends beyond at least one side thereof. Preferably, the shaft 46 extends through an opening 47 in the switch portion 28 and extends outwardly from both sides thereof. In a preferred embodiment, the housing 14 also includes at least one and preferably two slots 48 defined therein that is in communication with the channel 20. As a result of the spring portion 38 being biased upwardly from the receiver portion 24, the opposite ends of the shaft 46 are received in and captured by the slots 48 when the switch member 22 is in the fastening position. Those of ordinary skill in the art will appreciate that the use of an upwardly spring-biased switch portion 28 in conjunction with a slot 48 in the housing 14 is merely exemplary and that other methods of securing the switch member 22 in the fastening position may be used in accordance with the present invention. By way of non-limiting example, a spring could be used within the channel 20 that exerts a horizontal force on the switch member 22, or adhesives could be used to hold the switch member 22 in the fastening position.

Figure 4:
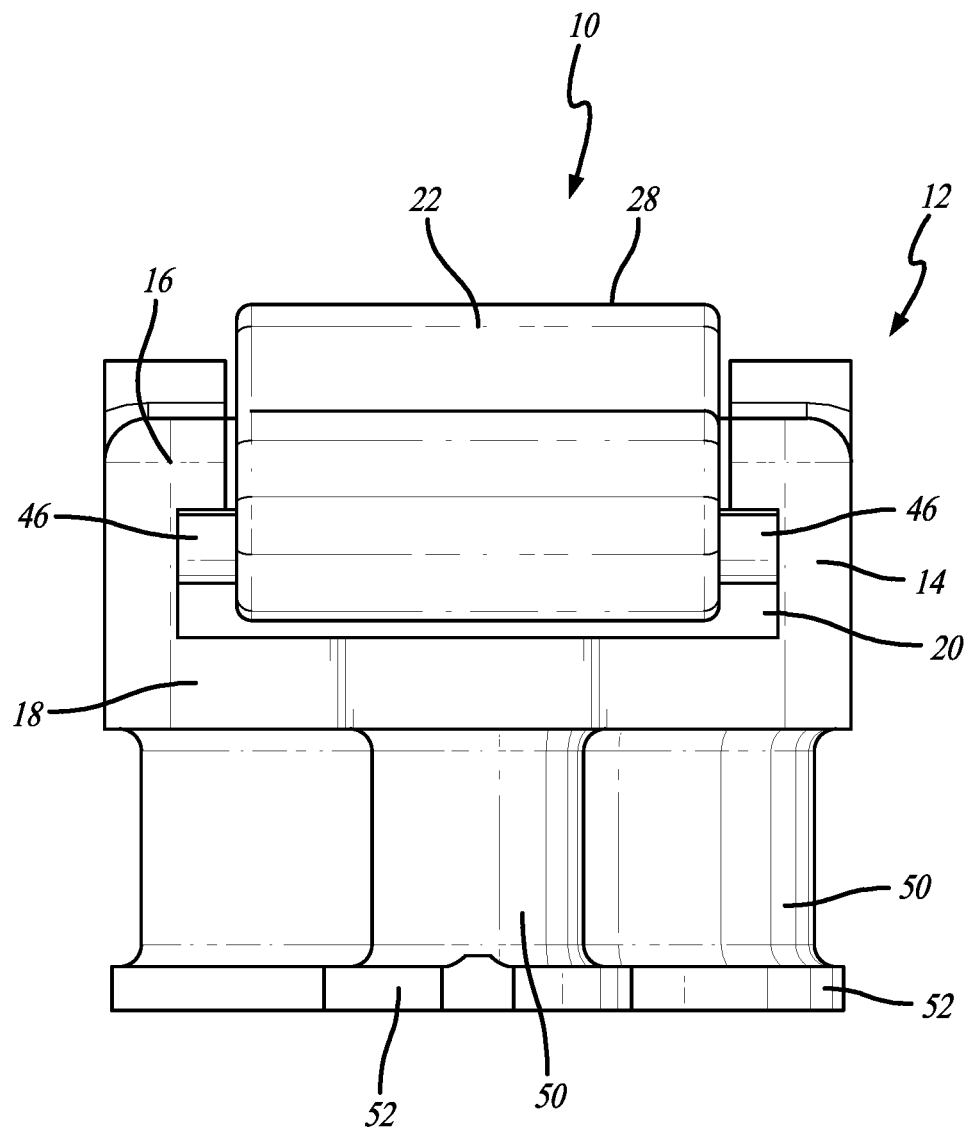
FIG. 4 is an end elevational view of the fastener system of FIG. 2 as viewed from the switch end with the switch member in the removing position.

FIG. 4 shows an end elevational view of a preferred embodiment of the present invention as viewed from the end of the switch member 22. FIG. 4 shows a preferred embodiment in which the switch portion 28 of the switch member 22 protrudes beyond the upper surface 16 of the housing 14.

An exemplary use of the fastening system 10 will now be described. The female fastener assembly 12 is secured to a first panel 42 and the male fastener assembly 14 is secured to a second panel. The switch member 22 is positioned in the removing position and the post 38 is inserted through the opening 54 in the first panel 42, through lower opening 30 and through the receiving portion 34 of the post opening 26. The switch member 22 (and shaft 46) are then moved within the channel 20 to the fastening position. Because the switch portion 28 is biased upwardly, when the opposite ends of the shaft 46 reach the slots 48, the opposite ends of the shaft 46 are forced into the slots 48, thereby securing the switch member 22 in the fastening position. The fastening portion 32 of the post opening is simultaneously aligned with the post 38 and a portion of the receiver portion 24 is received in slot 40.

To disengage or remove the two panels from one another, the switch portion 28 is pushed downwardly so that the opposite ends of the shaft 46 come out of slots 48 and inwardly so that the opposite ends of the shaft 46 slide along channel 20 (as shown in FIG. 4) until the switch portion 28 is in the removing position. In this position, the receiving portion 34 of the post opening 26 is aligned with the post 38. This allows the post 38 to be pulled out of the post opening 26, the lower opening 30 and the opening 54 in the first panel 42.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A fastener system for joining a first item and a second item, the fastener system comprising:
    a female fastener assembly that includes a housing having an upper wall with an upper surface, a lower wall with a lower surface and a channel defined between the upper and lower walls, wherein the female fastener assembly further comprises a switch member that is movable within the channel in the housing between a removing position and a fastening position, wherein the switch member includes a receiver portion having a post opening defined therein and a switch portion, wherein the housing includes a lower opening defined therein that extends through the lower surface thereof and is in communication with the channel, wherein the post opening includes a fastening portion and a removing portion, wherein the removing portion is aligned with the lower opening when the switch member is in the removing position and the fastening portion is aligned with the lower opening when the switch member is in the fastening position, and
    a male fastener assembly that includes a post having a slot defined therein,
    wherein at least a portion of the post is received through the lower opening in the housing and the post opening such that the slot is aligned with the channel, and wherein the slot receives a portion of the receiver portion when the switch member is in the fastening position.

2. The fastener system of claim 1 wherein in the removing position the switch portion is spring biased against the upper wall.

3. The fastener system of claim 1 wherein the switch portion includes a shaft that extends outwardly from at least one side thereof, wherein in the removing position the shaft is spring biased against the upper wall.

4. The fastener system of claim 3 wherein the housing has a slot defined therein that is in communication with the channel, and wherein the shaft is received in the slot when the switch member is in the fastening position.

5. The fastener system of claim 1 wherein the switch portion includes a shaft that extends outwardly from at least one side thereof, wherein the housing has a slot defined therein that is in communication with the channel, wherein the shaft is blocked from moving upwardly in the removing position, and wherein the shaft is received in the slot when the switch member is in the fastening position.

6. The fastener system of claim 1 wherein the receiver portion is movable to the removing position in a first direction and to the fastening position in a second direction, wherein the first direction is opposite of the second direction, wherein the switch portion and the receiver portion are connected by a neck portion, and wherein the switch portion is biased by the neck portion in a third direction that is not parallel to the first and second directions.

7. The fastener system of claim 1 wherein the receiver portion is positioned between the upper wall and the lower wall when it is movable between the removing position and the fastening position.

8. The fastener system of claim 1 wherein the post has a girth that is smaller than the width of the removing portion of the post opening and a width of the lower opening of the housing.

9. The fastener system of claim 1 wherein the lower opening of the housing is a self-aligning opening and is at least partially defined by an inclined surface, whereby when the post is inserted into the lower opening, the inclined surface guides the post into the lower opening.

10. The fastener system of claim 9 wherein the post includes an inclined surface that engages the inclined surface of the housing when the post is inserted into the lower opening.

11. The fastener system of claim 1 wherein the receiver portion is movable to the removing position in a first direction and to the fastening position in a second direction, wherein the first direction is opposite of the second direction, and wherein the switch portion is spring biased upwardly when the first and second directions are oriented horizontally.

* * * * *